(12) United States Patent
Liang et al.

(10) Patent No.: US 9,396,088 B2
(45) Date of Patent: Jul. 19, 2016

(54) COMPUTER EXECUTION PROGRESS INDICATOR

(71) Applicants: Xuebo Liang, Brossard (CA); Vincent Lavoie, Montreal (CA); Wanling Zhang, Montreal (CA); Alain Gauthier, Montreal (CA); Roman Sauber, Montreal (CA); Jonathan Viau, St-Hubert (CA)

(72) Inventors: Xuebo Liang, Brossard (CA); Vincent Lavoie, Montreal (CA); Wanling Zhang, Montreal (CA); Alain Gauthier, Montreal (CA); Roman Sauber, Montreal (CA); Jonathan Viau, St-Hubert (CA)

(73) Assignee: SAP SE, Walldorf (DE)

( * ) Notice: Subject to any disclaimer, the term of this patent is extended or adjusted under 35 U.S.C. 154(b) by 432 days.

(21) Appl. No.: 13/791,623

(22) Filed: Mar. 8, 2013

(65) Prior Publication Data

US 2014/0258910 A1    Sep. 11, 2014

(51) Int. Cl.
*G06F 3/01* (2006.01)
*G06F 11/34* (2006.01)
*G06F 11/32* (2006.01)
*G06F 3/00* (2006.01)

(52) U.S. Cl.
CPC .......... *G06F 11/3476* (2013.01); *G06F 11/323* (2013.01); *G06F 11/3419* (2013.01)

(58) Field of Classification Search
None
See application file for complete search history.

(56) References Cited

U.S. PATENT DOCUMENTS

| | | | |
|---|---|---|---|
| 6,349,321 B1* | 2/2002 | Katayama | 718/103 |
| 7,139,720 B1* | 11/2006 | Foell et al. | 705/7.22 |
| 8,136,114 B1* | 3/2012 | Gailloux et al. | 718/104 |
| 8,555,281 B1* | 10/2013 | van Dijk et al. | 718/100 |
| 2003/0074379 A1* | 4/2003 | Keohane et al. | 707/205 |
| 2005/0155015 A1* | 7/2005 | Novacek | G06F 8/34 717/105 |
| 2008/0263073 A1* | 10/2008 | Ohba et al. | 707/101 |
| 2009/0070699 A1* | 3/2009 | Birkill et al. | 715/772 |
| 2009/0164933 A1* | 6/2009 | Pederson et al. | 715/772 |
| 2009/0172093 A1* | 7/2009 | Matsubara | H04L 67/42 709/203 |
| 2011/0035749 A1* | 2/2011 | Krishnakumar et al. | 718/102 |
| 2012/0054175 A1* | 3/2012 | Barsness | G06F 17/30477 707/719 |
| 2012/0180055 A1* | 7/2012 | Brech et al. | 718/102 |
| 2012/0324578 A1* | 12/2012 | Seinfeld et al. | 726/24 |
| 2013/0246962 A1* | 9/2013 | Kaleta et al. | 715/772 |
| 2014/0115592 A1* | 4/2014 | Frean et al. | 718/102 |

* cited by examiner

*Primary Examiner* — Toan Vu
(74) *Attorney, Agent, or Firm* — Schwegman Lundberg & Woessner, P.A.

(57) ABSTRACT

Example systems and methods of providing an indicator of execution progress of a computer task are presented. In one example, a command to perform a computer task is received. The command is compared to a log of commands for computer tasks previously performed on the computer system and their associated execution times. At least one execution time is retrieved from the log based on the comparison. An indicator indicating an estimated execution time for the computer task is provided for presentation to a user of the computer system based on the at least one retrieved execution time.

20 Claims, 9 Drawing Sheets

RUNTIME DATA LOG 500

COMMAND1

| PARAM1 | PARAM2 | PARAM3 | PARAM4 | ... | RUNTIME |
|---|---|---|---|---|---|
| 6 | 5 | 10 | 8 | ... | 30 |
| 12 | 8 | 5 | 8 | ... | 20 |
| 3 | 1 | 50 | 8 | ... | 25 |
| ... | ... | ... | ... | ... | ... |

COMMAND2

| PARAM1 | PARAM2 | PARAM3 | PARAM4 | ... | RUNTIME |
|---|---|---|---|---|---|
| 2 | 6 | 3 | 1 | ... | 90 |
| 3 | 4 | 2 | 2 | ... | 110 |
| 4 | 4 | 4 | 3 | ... | 180 |
| ... | ... | ... | ... | ... | ... |

FIG. 5

COMPUTER EXECUTION PROGRESS INDICATOR

FIELD

This application relates generally to data processing and, in an example embodiment, to providing an indicator of progress regarding execution of one or more computer tasks to a user.

BACKGROUND

While computer systems are generally known for their speed and accuracy in performing difficult or complex logical or arithmetic tasks, many such tasks still consume a significant amount of time to complete, sometimes on the order of minutes. As a result, most computer systems, typically via their operating systems, may provide some dynamic visual indication, such as a progress bar, that informs the user how much time approximately remains until the task is complete, or what percentage or portion of the task has been completed.

For example, the transfer of large files or file folders from one disk drive to another may take several seconds or minutes to complete. To provide the user an indication of how long the task may take, the system may measure the transfer rate of the data transfer periodically, and revise the indicator accordingly to inform the user of the amount of time remaining until completion of the transfer, the amount of data remaining to be transferred, and/or the like.

However, in other examples, providing a progress indicator may be more difficult. For example, the computer task or tasks involved may be much more complicated, or not provide a means whereby progress may be measured, unlike a basic data transfer operation. Complex applications, for example, often employ complicated backend systems, in which multiple transaction systems (e.g., an enterprise resource planning (ERP) system, a customer relationship management (CRM) system, and/or a human resources (HR) system) may be accessed to satisfy complex business requirements. Further, one or more reporting systems (e.g., a business warehouse (BW) or business intelligence (BI) system) may also be involved in the same task. In such complicated systems, determining the specific systems that are used for a particular command or task, and to what extent each of the systems will be employed, in order to provide a progress indicator may be extremely difficult.

In the alternative, the operating system or another portion of the system may periodically query or poll the process or thread performing such a task to determine the progress of the computer task, but such polling may increase the amount of processing overhead of the process or thread that is executing the actual task at hand, thus increasing the amount of time consumed by the task. In addition, the processing time of such tasks may depend on a number of characteristics of the actual computer system performing the task, rendering generic execution time estimates that apply to all computer systems somewhat inaccurate. Further, as noted above, determining which portions of the computer system are involved in the particular task may be difficult to determine. Consequently, determining which portions of the system to poll may be problematic under some scenarios.

BRIEF DESCRIPTION OF DRAWINGS

The present disclosure is illustrated by way of example and not limitation in the figures of the accompanying drawings, in which like references indicate similar elements and in which:

FIG. 5 is a block diagram of an example runtime data log for storing representations of commands for computer tasks and their associated execution runtimes;

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
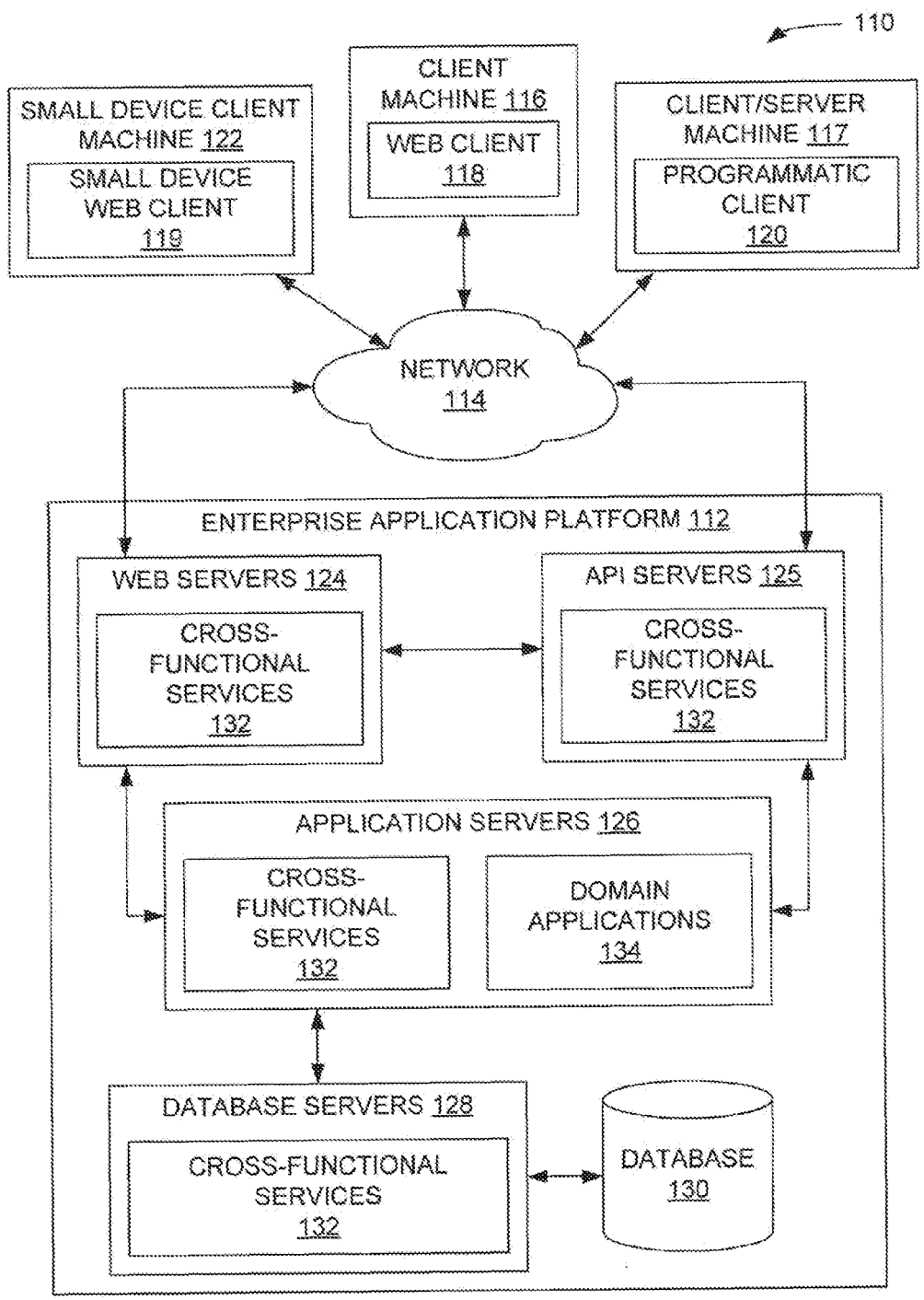
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g. a browser, such as the Internet Explorer® browser developed by Microsoft® Corporation), a small device client machine 122 with a small device web client 119 (e.g., a browser without a script engine), and a client/server machine 117 with a programmatic client 120.

Turning specifically to the enterprise application platform 112, web servers 124 and application program interface (API) servers 125 are coupled to, and provide web and programmatic interfaces to, application servers 126. The application servers 126 are, in turn, shown to be coupled to one or more database servers 128, which may facilitate access to one or more databases 130. The web servers 124. API servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third-party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
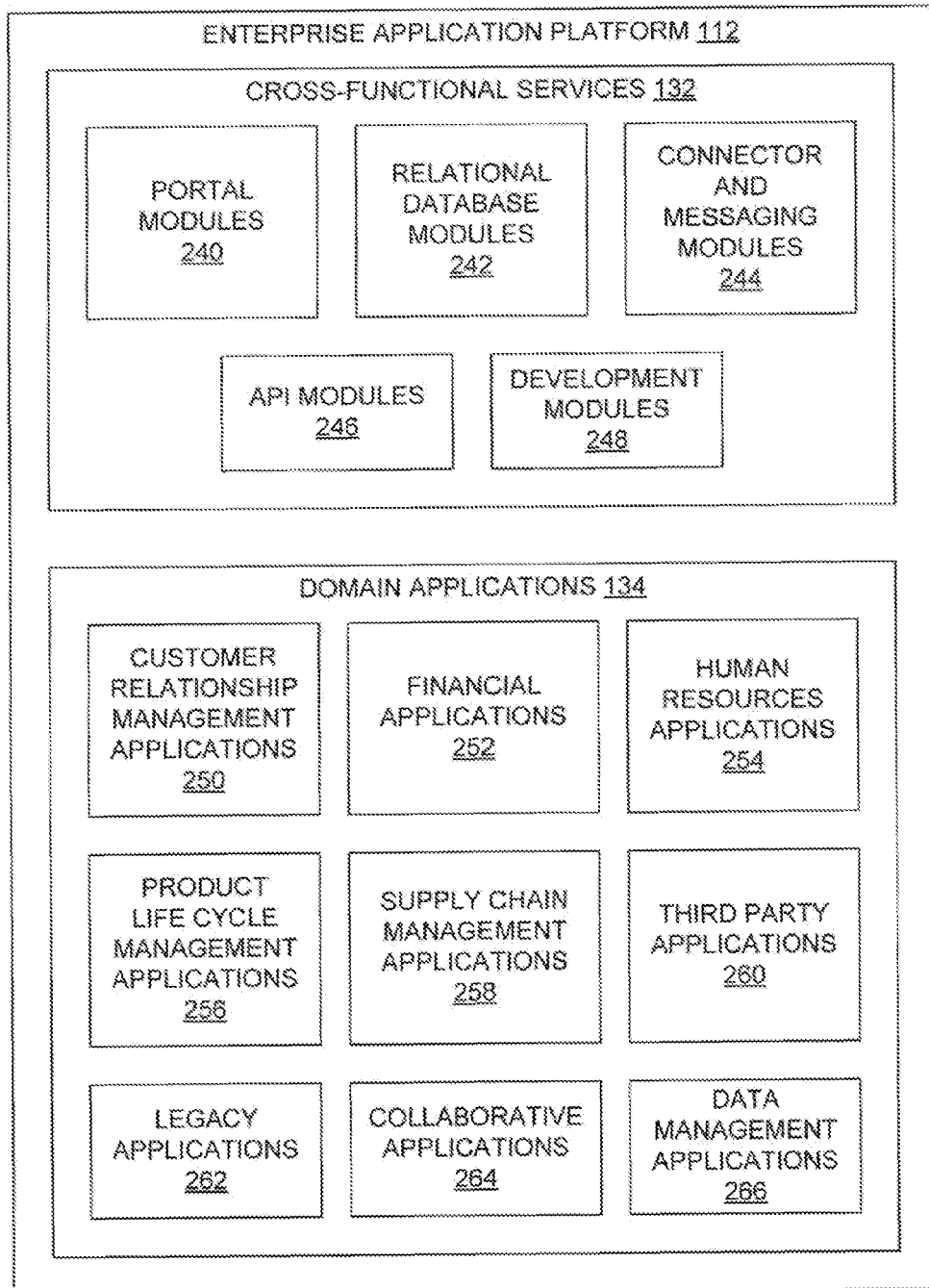
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, API modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java®, Java 2 Platform—Enterprise Edition (J2EE), SAP's Advanced Business Application Programming (ABAP®) Language and Web Dynpro, eXtensible Markup Language (XML), Java Connector Architecture (JCA). Java Authentication and Authorization Service (JAAS), X.509. Lightweight Directory Access Protocol (LDAP), Web Services Description Language (WSDL), WebSphere Service Registry and Repository (WSRR), Simple Object Access Protocol (SOAP), Universal Description, Discovery and Integration (UDDI), and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, Structured Query Language (SQL), SQL Database Connectivity (SQLDBC), Oracle®, MySQL, Unicode, and Java Database Connectivity (JDBC).

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The API modules 246 may enable the development of service-based applications by exposing an interface to existing and new applications as services. Repositories may be included in the platform 112 as a central place to find available services when building applications.

The development modules 248 may provide a development environment for the adding, integrating, updating, and extending of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel who are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the lifecycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
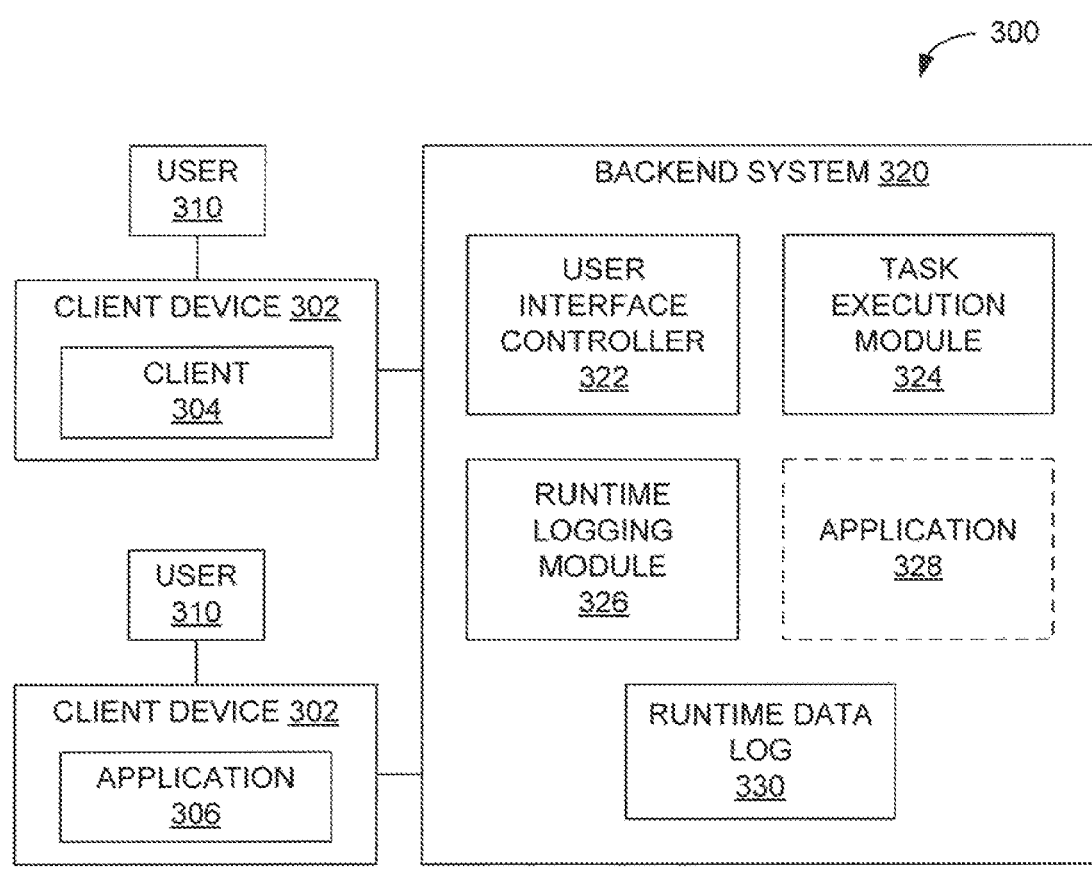
FIG. 3 is a block diagram of an example system in which an execution progress indicator for a computer task being executed therein is generated.

FIG. 3 is a block diagram of an example system 300 in which an execution progress indicator for a computer task being executed therein is generated. The system 300 may include a backend system 320 coupled to one or more client devices 302, such as by way of a communication network. Within the environment of FIG. 1, examples of the client devices 302 may include any of the small device client machine 122, the client machine 116, and the client/server machine 117. Also, in some implementations, the backend system 320 may be the enterprise application platform 112 or some portion thereof, coupled with the client devices 302 via the network 114. Each of the client devices 302 may be a personal computer (PC), a laptop computer, a tablet computer, a smart phone, a personal digital assistant (PDA), or any other device configured to interact with the backend system 320. As depicted in FIG. 3, a client device 302 may include a client 304 to interact with an application 328 executing one or more computer tasks on the backend system 320. In other examples, a client device 302 may execute an application 306 directly, with the application 306 employing the backend system 320 for execution of one or computer tasks in support of the application 306.

As employed herein with respect to FIG. 3, a computer task may be any task executed within the backend system 320 that is initiated directly or indirectly by a user 310 of a client device 302 and results in some response provided to the user 310. The time period between the initiation of the task and the results of the task being returned represents a time period during which the user 310 may be awaiting the results. In the examples presented herein, previously measured execution times of one or more computer tasks may be employed to generate an estimated or expected execution time for a new computer task initiated by a user 310.

The backend system 320, which executes the computer task (or tasks) of interest and generates the estimated execution time for that task, may include a user interface controller 322, a task execution module 324, a runtime logging module 326, and a runtime data log 330, possibly in addition to an application 328 accessible by the user 310 via the client device 302. In other implementations, one or more of these modules 322-330 may be combined into fewer modules or subdivided to yield a greater number of modules. Also, at least one module may be omitted or additional modules may be included compared to those illustrated in FIG. 3.

In the backend system 320, the user interface controller 322 may perform one or more functions in association with the client device 302 of a user 310, including, for example, receiving a command from the client device 302 that initiates one or more computer tasks, transmits or displays a dynamic progress indicator to the client device 302 (or provide information to allow the generation of such an indicator at the client device 302), and transmits or displays one or more results generated from the execution of the computer task initiated via the received command for presentation to the user 310 via the client device 302. In one implementation, the user interface controller 322 may be included in a web server 124 or API server 125 as a cross-functional service 132, as illustrated in FIG. 1.

The task execution module 324 of the backend system 320 may be responsible for executing the one or more computer tasks initiated via the command received at the user interface controller 322. The task execution module 324 may also return any results of the execution of the computer task via the user interface controller 322 to the client device 302 for presentation or notification to the user 310. In some examples, the task execution module 324 may be a cross-functional service 132 or domain application 134 as implemented in an application server 126, a database server 128, or another server of the enterprise application platform 112 of FIG. 1.

Continuing with FIG. 3, the runtime logging module 326 may calculate an estimated execution time for one or more computer tasks associated with the command received at the user interface controller 322. As described in greater detail below, the runtime logging module 326 may compare the received command with other commands previously executed by the task execution module 324 in the runtime data log 330, may retrieve one or more measured execution times from the runtime data log 330 based on that comparison, and then generate an estimated execution time associated with the received command. The user interface controller 322 may then employ the estimated execution time to transmit or display the dynamic progress indicator to the client device 302 of the user 310, or at least provide information allowing the client device 302 to display the indicator. In some examples, the runtime logging module 326 may also measure the execution time of the computer tasks associated with the received command and store the measured execution time in the runtime data log 330 for subsequent use in estimating execution times of computer tasks of other commands. FIG. 5 provides an example of data stored in the runtime data log 330 in one embodiment.

In some examples, the backend system 320 may be executing an application 328 employed by the user 310 via the client device 302, and thus may serve as the execution context in which the received command is initiated. In some implementations, the application 328 may be any of the domain applications 134 of FIG. 1 executing on the application servers 126. In other embodiments, an application 306 executing on the client device 302 may provide such an execution context. In yet other examples, the command may not be issued within the context of an application 306 or 328. For instance, the command may be an operating system command that causes one or more computer tasks to be performed at the task execution module 324.

In yet other implementations, a system other than the system 300 of FIG. 3 may provide the environment in which the embodiments described herein may be performed. For example, a user 310 may interact directly with a single computer system that performs the computer tasks of interest, as opposed to communicating with an executing system via a separate client device 302. In such examples, the system 300 may perform the execution time measurements, generate the estimated execution times, and provide the user 310 a dynamic graphical indicator associated with the estimated execution time.

Thus, by employing the system 300 of FIG. 3, measured execution times of computer tasks previously executed on a computer system may be utilized to generate an estimated execution time for a computer task that is to be executed on the same system. As a result, execution times for computer tasks that are complex, or exhibit execution progress that is difficult to monitor, may be generated using empirical data generated on the same computer system. Other possible aspects of the system 300, as well as other systems and methods described below, are discussed in greater detail below.

Figure 4A:
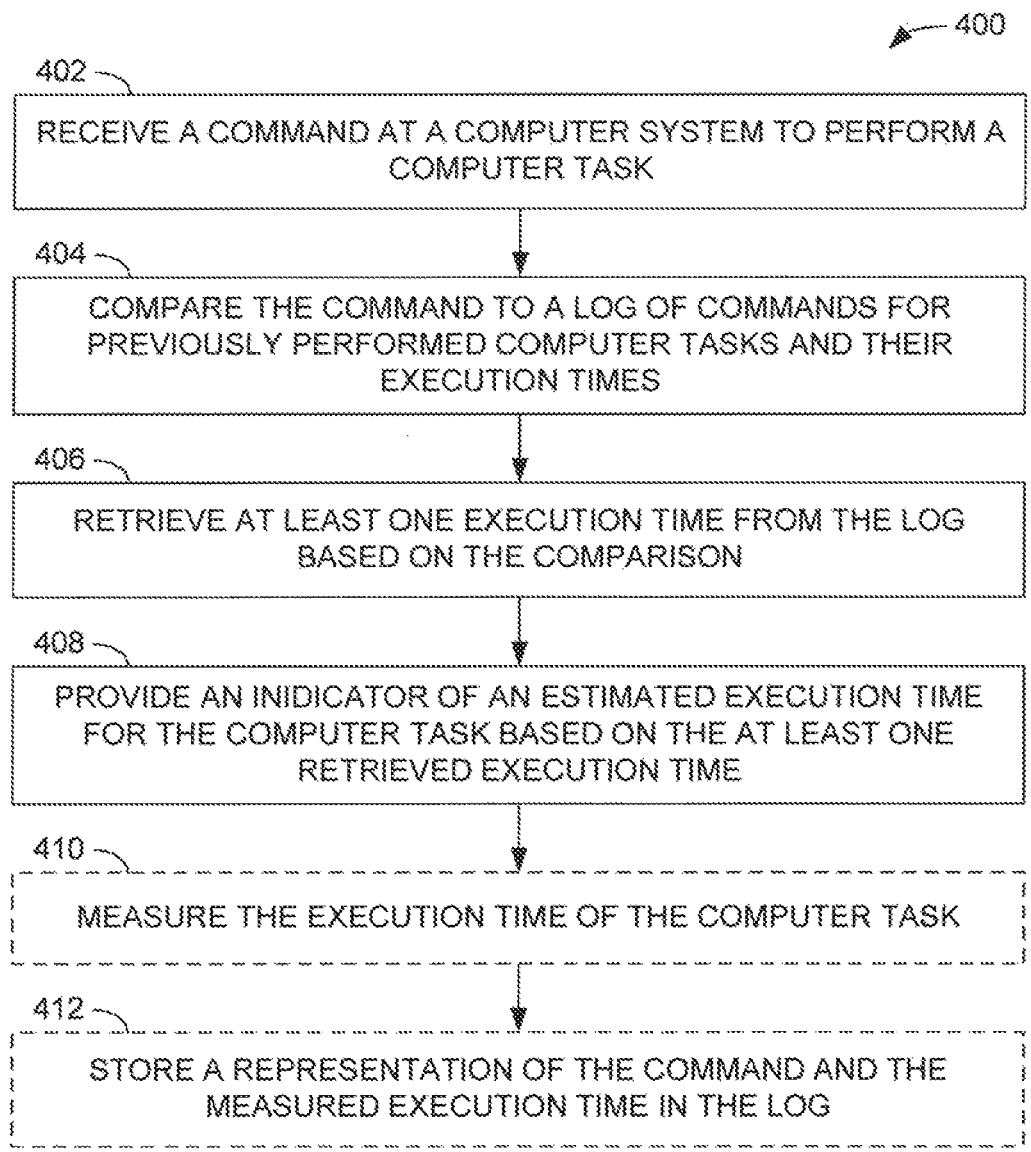
FIG. 4A is a flow diagram illustrating an example method of generating an indicator of an estimated execution time for a computer task.

FIG. 4A is a flow diagram illustrating an example method 400 of generating an indicator of an estimated execution time for a computer task. While at least some of the operations of the method 400 and other methods described herein may be performed in the backend system 320 of FIG. 3, other devices or systems may be employed to perform the method 400 in other embodiments.

In the method 400, a command to perform a computer task may be received at a computer system (operation 402), such as the backend system 320 of FIG. 3. In some examples, the command may cause the initiation of more than one separately-identifiable computer tasks to be executed. The command may be compared to a log of commands for computer tasks previously performed at the computer system, along with their corresponding execution times, as measured when executed on the computer system (operation 404). Based on this comparison, at least one of the measured execution times may be retrieved from the log (operation 406), and an indicator of an estimated execution time for the computer task may be generated based on the at least one retrieved execution time (operation 408). As is discussed in greater detail below, more than one execution time may be retrieved from the log, and those execution times may be combined (e.g., summed or averaged) in some way to generate the estimated execution time for the current computer task.

In addition, the execution time of the current computer task in the computer system may be measured (operation 410), and a representation of the command and the measured execution time may be stored in the log (operation 412), thus making that information available to estimate execution times for subsequent computer tasks executed on the computer system. In some examples, the execution time of the current computer task may be measured but not subsequently stored if, for example, the measured execution time exceeds some predetermined value, or if the measured execution time exceeds some range outside an average execution time of measured execution times stored in the log that are related to the current command. Further, the execution time of the current computer task may not be measured if the command is in some way associated with a computer task that is not executed in a typical or normal operational environment, such as during a debugging session in which breakpoints, execution traces, and/or other mechanisms are employed which adversely affect the execution time of the computer task.

While the operations 402 through 412 of the method 400 of FIG. 4A are shown in a specific order, other orders of operation, including possibly concurrent or continual execution of at least portions of one or more operations, may be possible in some implementations of method 400, as well as other methods discussed herein. For example, the measuring of the execution time of the computer task (operation 410) may overlap any or all of the comparing (operation 404), retrieving (operation 406), and the providing (operation 408) operations in some embodiments.

Figure 4B:
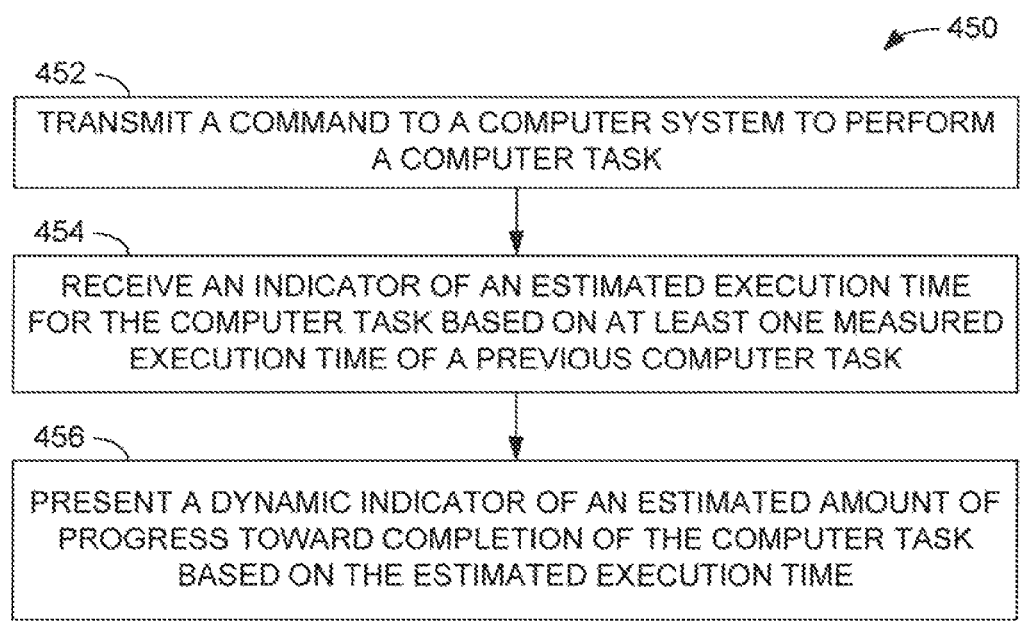
FIG. 4B is a flow diagram illustrating an example method of providing a dynamic execution progress indicator for a computer task to a user.

FIG. 4B is a flow diagram illustrating an example method 450 of providing a dynamic execution progress indicator for a computer task to a user. In at least one example, the dynamic execution progress indicator may be based on the estimated execution time generated in method 400 of FIG. 4A. In one example, the method 450 may be executed wholly or partially within the client device 302 of FIG. 2, although other systems or devices may be employed for the same purpose. In the method 450, a command is transmitted to a computer system (e.g., the backend system 320 of FIG. 3) to perform at least one computer task (operation 452). In response to transmitting the command, an indicator of an estimated execution time for the computer task may be received (operation 454), with the estimated execution time being based on at least one measured execution time of a computer task that was previously executed on the computer system. Based on the estimated execution time, a dynamic indicator of an estimated amount of progress to completion of the computer tasks may be presented to a user (operation 456). In one example, the dynamic indicator is continually or repeatedly updated based on the elapsed amount of time since the command was transmitted, or the computer task was initiated. An example of a dynamic indicator, as may be generated in the method 450, is discussed below in conjunction with FIG. 7.

FIG. 5 is a block diagram of an example runtime data log 500 for storing representations of commands for computer tasks and their associated execution times. This runtime data log 500 may be just one example of the runtime data log 330 of FIG. 3. In the runtime data log 500, a plurality of execution times, or "runtimes" 506, are listed, each of which is associated with a particular command 502 (e.g., Command1, Command 2, etc.) to execute one or more specific computer tasks. Each of the commands 502 may be a command issued from within an application, such as a database element access, a generation or update of a worksheet or spreadsheet, a data conversion or transfer, or the like. In a more specific embodiment, one or more commands 502 may be issued within the environment of the enterprise application platform 112 of FIG. 1, such as commands regarding data and documents relating to a business planning object or document (e.g., objects or documents related to trade promotion management (TPM)). For example, the commands 502 may include the saving of a newly created document; a first-time navigation of an existing document; a subsequent navigation of a document; an expansion, collapse, or update of a single cell of a document; an expansion, collapse, or update of all rows or columns, or of the entirety, of a document; an update of selected multiple cells of a document; and so on. As a result, each of the commands 502 may result in execution of one or more individual computer tasks regarding the document. Runtimes for many other types of commands 502 related to other types of documents or data other than business-related activities may be stored in the runtime data log 500 in other examples.

In addition to associating each measured runtime 506 in the runtime data log 500 with a particular command 502, each runtime 506 may also correspond with one or more parameters 504 accompanying the command 502. In the business document example discussed above, one or more of the commands 502 may include one or more parameters 504 specifying, for example, the length of time the document covers (e.g., in months), the number of customer accounts involved, the number of products for sale being covered, and so on, each of which may have an impact on the amount of time consumed in executing the corresponding computer tasks. In other types of commands 502 not associated with business documents or objects, other types of parameters 504 may be stored to further characterize the runtimes 506 associated with those commands 502. Further, each command 502 may be associated with a particular set of parameters 504 that is different from the parameter sets of other commands 502.

In some examples, various runtimes 506 stored in the runtime data log 500 may be modified within, or deleted from, the runtime data log 500 over time to reduce the amount of data stored in the runtime data log 500. For example, each of the runtimes 506 may be related to a particular value indicating the "age" of the runtime 506, with older runtimes 506 eventually deleted from the runtime data log 500 due to decreased relevance compared to execution times of computer tasks that were more recently executed. In other implementations, one or more runtimes 506 may be combined (e.g., averaged) with other runtimes 506, and possibly weighted accordingly to reflect the original number of runtimes 506 stored in the runtime data log 500.

Figure 6:
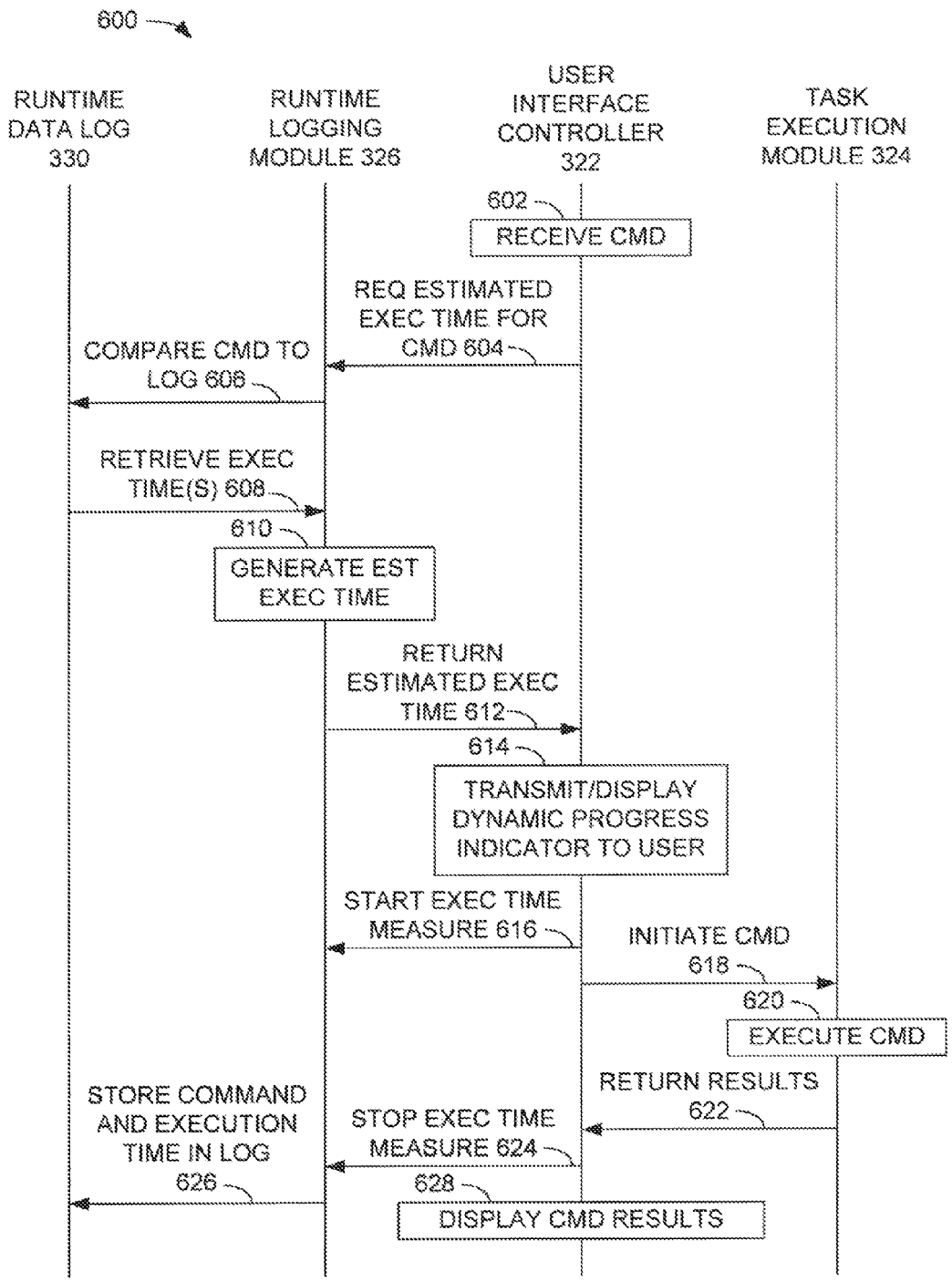
FIG. 6 is a communication diagram illustrating an example method of generating and displaying to a user an execution progress indicator for a computer task.

FIG. 6 is a communication diagram illustrating an example method 600 of generating and displaying to a user an execution progress indicator for a computer task. In FIG. 6, the method 600 is described in conjunction with the backend system 320 of FIG. 3, although other systems not explicitly described herein may employ the method 600 wholly or partially in other embodiments.

In the method 600, the user interface controller 322 receives a command to execute one or more computer tasks in the backend system 320 (operation 602). In one example, the command may include one or more parameters that further define or specify the computer tasks to be executed. In response to receiving the command, the user interface controller 322 may request an estimated execution time for the command from the runtime logging module 326 (operation 604). The request may include an identification of the command, possibly along with any parameters that may affect the actual execution time of the computers tasks initiated by the command.

In response to the request for the estimated execution time, the runtime logging module 326 may compare the received command to the data stored in the runtime data log 330 (operation 606) and retrieve one or more execution times (e.g. runtimes 506) from the runtime data log 330 based on the comparison (operation 608). In one example, the runtime logging module 326 may retrieve runtimes 506 for previously executed commands 502 that match, equal, or otherwise favorably compare with the current command. If no stored commands 502 match the current command, another stored command 502 that nearly or most closely matches the current command may be used as a favorable comparison. Similarly, the runtime logging module 326 may compare any parameters received with the current command to the stored parameters 504 of the matching (or near-matching) commands 502, and retrieve those runtimes 506 associated with matching (or near-matching) parameters 504.

Based on the one or more retrieved runtimes 506, the runtime logging module 326 may generate the estimated execution time (operation 610) in a number of ways. For example, if a single runtime 506 was retrieved from the runtime data log 330, the runtime logging module 326 may return the retrieved runtime 506 without modification as the estimated execution time to the user interface controller 322. In another example, the runtime logging module 326 may alter the retrieved runtime 506 if the command 502 and/or parameters 504 are different in some way from those associated with the current command. If, instead, a plurality of runtimes 506 associated with matching, near-matching, or most-closely matching commands 502 and/or parameters 504 are retrieved from the runtime data log 330, the runtime logging module 326 may select one of the retrieved runtimes 506 as the estimated execution time, or may combine two or more of the retrieved runtimes 506 to generate the estimated execution time. Depending on the particular implementation, the runtime logging module 326 may employ one or more different methods for generating the estimated execution time from multiple retrieved runtimes 506, such as, for example, the mode, median or mean of the runtimes 506, or a more sophisticated correlation and/or dependence algorithm. Such algorithms may include, for example, nearest-neighbor interpolation, Barnes interpolation, and bi-linear interpolation.

In other examples, the runtime data log 330 may include runtimes 506 for individual computer tasks, as opposed to just overall commands. Consequently, the runtime logging module 326, upon receiving a command, may determine which computer tasks the command initiates, retrieve one or more runtimes 506 associated with each computer task, and then combine (e.g., sum) two or more of the runtimes 506 to generate the estimated execution time for the command.

In some situations, the received command may not match any of the commands for which runtimes 506 are stored in the runtime data log 330. As a result of such an unfavorable comparison between the received command and the runtime data log 330, the runtime logging module 326 may return some default or predetermined value as the estimated execution time for the command. Subsequently, after the current command has been executed, the runtime logging module 326 may store the measured execution time for the command in the runtime data log 330 as a subsequent runtime 506 for subsequent retrieval.

After generating the estimated execution time for the command, the runtime logging module 326 may the return the generated estimated execution time to the user interface controller 322 (operation 612), which may then transmit and/or display a dynamic progress indicator to a user 310 that initiated the command (operation 614). In one implementation, the user interface controller 322 may generate a progress bar or similar graphical indication that is continually or repeatedly updated on a display while the computer tasks of the command are executed to indicate the amount of progress made in the execution of the computer tasks. An example of such a progress bar is described below in connection with FIG. 7. Further, the dynamic progress indicator may be transmitted to the client device 302 of the user 310 as a Flash® movie or similar program for display on the client device 302. In another example, the user interface controller 322 may display the dynamic progress indicator to the user 310 of the client device 302 via a series of updates to a display. In yet other implementations, the user interface controller 322 may provide a representation of the estimated execution time to the client device 302, which may then generate and display the dynamic progress indicator to the user 310. Other methods by which the dynamic progress indicator is transmitted to, or displayed by, the client device 302 may be utilized in other implementations.

The user interface controller 322 may also initiate the process of measuring the execution time of the computer tasks associated with the current command so that information regarding the command and the measured execution time may be stored in the runtime data log 330 for use in generating estimated execution times for subsequent commands. To that end, the user interface controller 322 may issue a request to the runtime logging module 326 to start measurement of the execution time for the current command (operation 616). In one example, the runtime logging module 326 may start an internal timer based on a local timing reference.

The user interface controller 322 may then initiate the command via the task execution module 324 (operation 618). In response, the task execution module 324 may then execute the command via one or more computer tasks (operation 620). After completing execution of the command, the task execution module 324 may return any results resulting from execution of the command to the user interface controller 322 (operation 622) for possible forwarding or display of the results to the user 310 of the client device 302 (operation 628).

In response to the completion of execution of the command, the user interface controller 322 may also issue a request to the runtime logging module 326 to stop the measurement of the execution time for the current command (operation 624). In reference to the example described above, the runtime logging module 326 may stop the internal timer that was started earlier and retrieve the resulting measured execution time from the timer. The runtime logging module 326 may then store the measured execution time in the runtime data log 330 (operation 626), along with the current command and any associated parameters. In one example, the runtime logging module 326 may combine the measured execution time and associated command and parameter information with one or more entries in the runtime data log 330, as described in greater detail above.

Figure 7:
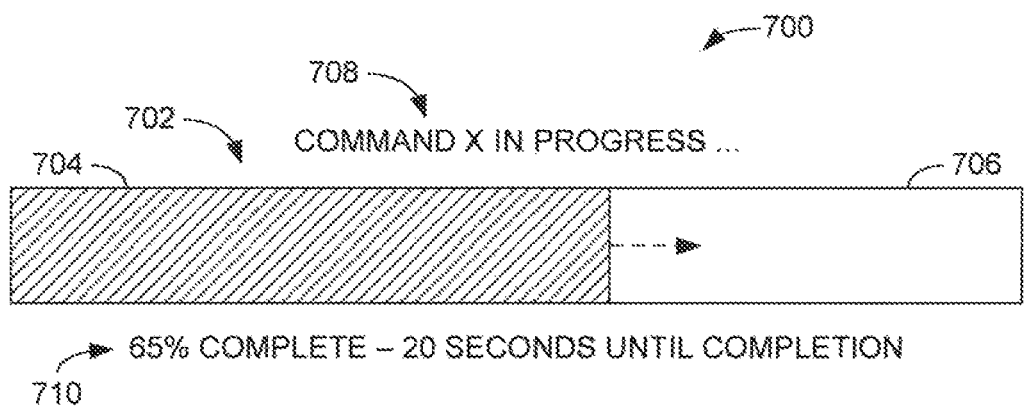
FIG. 7 is a graphical representation of an example dynamic execution progress indicator for a computer task.

FIG. 7 is a graphical representation of an example dynamic progress indicator 700 for one or more computer tasks associated with a currently executing command. In this example, the dynamic progress indicator 700 may include a progress bar 702 that is constantly updated to provide a timely estimate to the user 310 of how much of the current command has been completed. More specifically, a shaded portion 704 of the progress bar 702 graphically depicts an estimated percentage or portion of the command (e.g., Command X) that has been completed, while a solid portion 706 of the progress bar 702 depicts an estimated percentage or portion of the command that remains to be executed. Further, the dynamic progress indicator 700 may include a text label 708 indicating the particular command or computer task being executed, along with a textual description 710 of the estimated completion percentage, estimated time to completion, and/or possibly other information associated with the execution of the command. Of course, FIG. 7 represents just one possible example of a dynamic progress indicator 700, as many other methods of presenting the same or similar information to the user 310 are also possible.

In one example, the dynamic progress indicator 700 may reach a predetermined amount of progress (e.g. 90 percent) before the computer task completes. In response, the user interface controller 322 or the client device 302 may maintain the indication of the predetermined amount of progress in the dynamic progress indicator 700 until the computer task completes. In response to task completion, the user interface controller 322 or the client device 302 may then exhaust the remaining amount of progress indicated (e.g., by advancing the dynamic progress indicator 700 to indicate 100 percent) within some predetermined amount of time (e.g., 0.5 seconds).

In another example, the dynamic progress indicator 700 may have not reached the 90 percent completion mark prior to the completion of the computer task. Under that scenario, the user interface controller 322 or the client device 302 may exhaust the remaining amount of progress within some predetermined time (e.g. 0.5 seconds).

According to at least some embodiments described herein, an estimated execution time for one or more computer tasks associated with a command is generated based on measured execution times corresponding to the same or similar commands that were previously executed on the same computer system. Accordingly, the estimated execution times are likely to possess a significant measure of accuracy compared to execution times that are measured on a development or test system that may exhibit substantially different execution time characteristics. In addition, as more commands are executed, and more runtimes are stored to be used in the generation of subsequent execution time estimates, the system exhibits self-learning properties by which the estimated execution times may become even more accurate, as these estimates may account for changes in the hardware, software, and other aspects of the execution environment of the system that may occur over time.

Figure 8:
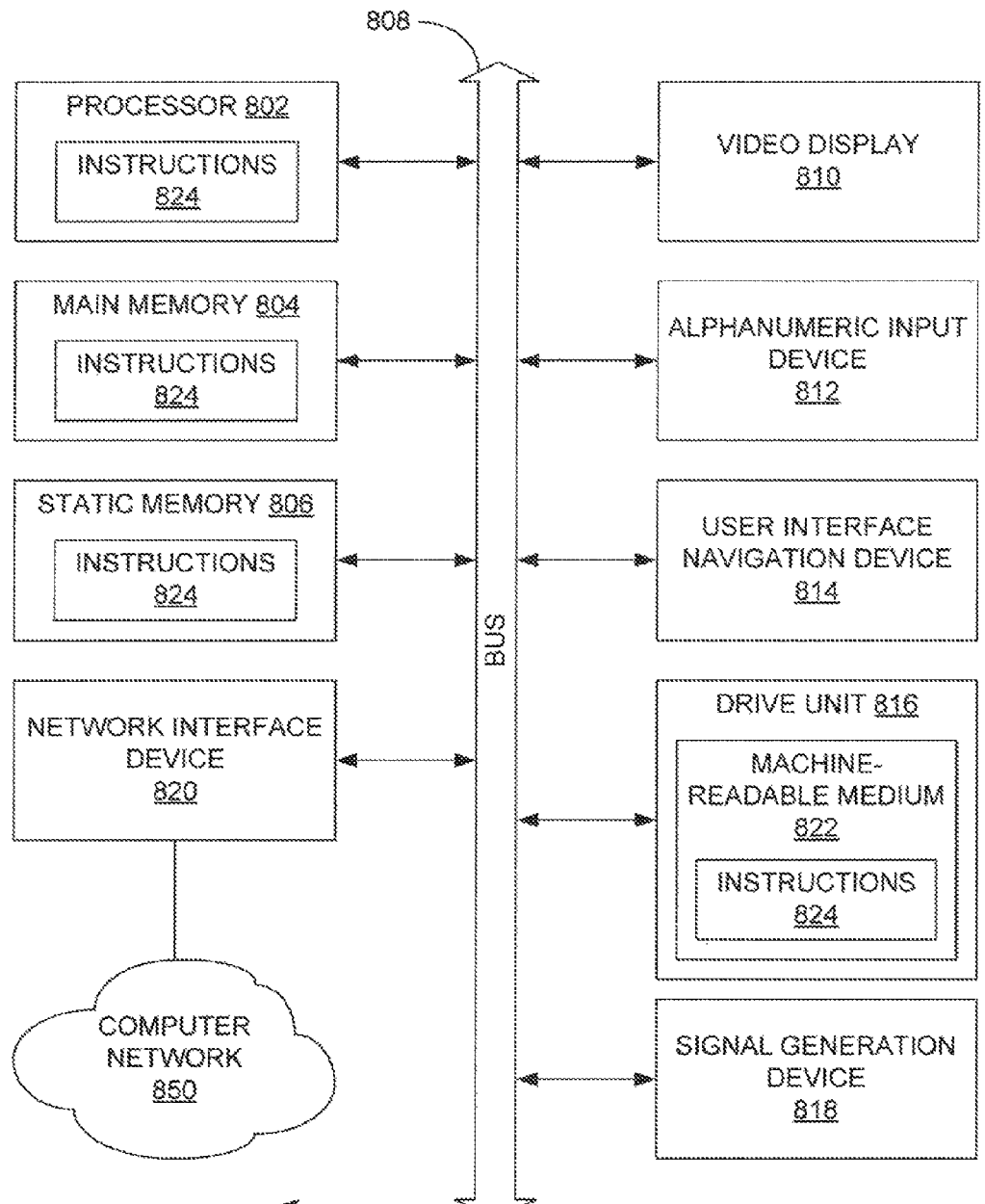
FIG. 8 is a block diagram of a machine in the example form of a processing system within which may be executed a set of instructions for causing the machine to perform any one or more of the methodologies discussed herein.

FIG. 8 depicts a block diagram of a machine in the example form of a processing system 800 within which may be executed a set of instructions 824 for causing the machine to perform any one or more of the methodologies discussed herein. In alternative embodiments, the machine operates as a standalone device or may be connected (e.g. networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (e.g., a central processing unit (CPU), a graphics processing unit (GPU), or both), a main memory 804 (e.g., random access memory), and static memory 806 (e.g. static random-access memory), which communicate with each other via bus 808. The processing system 800 may further include video display unit 810 (e.g., a plasma display, a liquid crystal display (LCD), or a cathode ray tube (CRT)). The processing system 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804, the static memory 806, and/or within the processor 802 during execution thereof by processing system 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 800) or one or more hardware modules of a computer system (e.g. a processor 802 or a group of processors) may be configured by software (e.g. an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 802 that is configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine but deployed across a number of machines. In some example embodiments, the processors 802 may be located in a single location (e.g., within a home environment, within an office environment, or as a server farm), while in other embodiments, the processors 802 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of providing graphical indicators of execution progress of commands to perform computer tasks, the method comprising:
   receiving, at a computer system, a first command to perform a first computer task;
   comparing the first command to a log relating each of a plurality of commands for corresponding computer tasks previously performed on the computer system or each of the corresponding computer tasks to a measured execution time for the previously performed computer task;
   retrieving from the log, based on a comparison between the first command and a first stored command of the log, a first execution time corresponding to the first stored command;
   generating a first estimated execution time for the first command by modifying the retrieved first execution time; and
   providing, for presentation to a user of the computer system, a graphical indicator of the execution progress of the first command based on the first estimated execution time;
   receiving, at the computer system, a second command to perform second and third computer tasks;
   comparing the second and third computer tasks to the log;
   retrieving from the log, based on comparisons between the second and third computer tasks and second and third stored computer tasks of the log, second and third execution times corresponding respectively to the second and third stored computer tasks;
   generating a second estimated execution time for the second command by summing the retrieved second and third execution times; and
   providing, for presentation to a user of the computer system, a second graphical indicator of the execution progress of the second command based on the second estimated execution time.

2. The method of claim 1, further comprising:
   measuring an execution time of the first computer task on the computer system; and
   storing a representation of the first command and the measured execution time in the log, the representation of the command to be compared with a subsequent command to perform a subsequent computer task on the computer system to determine an estimated execution time for the subsequent computer task.

3. The method of claim 1, wherein:
   the first command comprises at least one parameter affecting the execution time of the first computer task,
   each of at least some of the plurality of commands in the log comprises at least one parameter affecting the execution time of the computer task corresponding to the associated command, and
   the comparing of the first command to the log comprises comparing the at least one parameter of the first command to a corresponding parameter of at least one stored command of the log.

4. The method of claim 1, further comprising:
   retrieving, based on the comparison between the first command and all of the commands of the log, a default execution time; and providing, for presentation to the user of the computer system, a third graphical indicator of the execution progress of the first command based on the default execution time.

5. The method of claim 1, wherein the comparison between the first command and the first stored command of the log comprises the first command being the same as the first stored command of the log.

6. The method of claim 1, wherein the comparison between the first command and the first stored command of the log comprises the first command being most closely related to the first stored command of the log compared to other stored commands of the log.

7. The method of claim 1, wherein modifying the retrieved first execution time comprises an interpolation of the retrieved first execution time and at least another retrieved execution time from the log.

8. The method of claim 1, further comprising:
retrieving from the log, based on a comparison between the first command and a second stored command of the log, a fourth execution time corresponding to the second stored command; and
generating the first estimated execution time further based on the retrieved fourth execution time for the second stored command.

9. The method of claim 8, wherein the first estimated execution time is based on at least one of an average, a median, a mode, and an interpolation of the retrieved first execution time and the retrieved fourth execution time.

10. A non-transitory computer-readable storage medium comprising instructions that, when executed by at least one processor of a machine, cause the machine to perform operations comprising:
receiving, at a computer system, a first command to perform a first computer task;
comparing the first command to a log relating each of a plurality of commands for corresponding computer tasks previously performed on the computer system or each of the corresponding computer tasks to a measured execution time for the previously performed computer task;
retrieving from the log, based on a comparison between the first command and a first stored command of the log, at least one first execution time corresponding to the first stored command;
generating a first estimated execution time for the first command by modifying the retrieved at least one first execution time;
providing, for presentation to a user of the computer system, a graphical indicator of the execution progress of the first command based on the first estimated execution time;
receiving, at the computer system, a second command to perform second and third computer tasks;
comparing the second and third computer tasks to the log;
retrieving from the log, based on comparisons between the second and third computer tasks and second and third stored computer tasks of the log, second and third execution times corresponding respectively to the second and third stored computer tasks;
generating a second estimated execution time for the second command by summing the retrieved second and third execution times; and
providing, for presentation to a user of the computer system, a second graphical indicator of the execution progress of the second command based on the second estimated execution time.

11. The computer-readable storage medium of claim 10, the operations further comprising:
measuring an execution time of the first computer task on the computer system; and
storing a representation of the first command and the measured execution time in the log, the representation of the first command to be compared with a subsequent command to perform a subsequent computer task on the computer system to determine an estimated execution time for the subsequent computer task.

12. The computer-readable storage medium of claim 11, the storing of the representation of the first command and the measured execution time in the log being based on the measured execution time being less than a predetermined value.

13. The computer-readable storage medium of claim 11, the storing of the representation of the first command and the measured execution time in the log being based on the measured execution time lying within a predetermined value of an average execution time of a plurality of execution times stored in the log related to the first command.

14. A system comprising:
at least one hardware processor;
a user interface module implemented by the at least one processor and configured to receive a first command to perform a first computer task;
a progress module implemented by the at least one processor and configured to:
compare the first command to a log relating each of a plurality of commands for corresponding computer tasks previously performed on the computer system or each of the corresponding computer tasks to a measured execution time for the previously performed computer task;
retrieve from the log, based on a comparison between the first command and a first stored command of the log, at least one first execution time corresponding to the first stored command; and
generate a first estimated execution time for the first command by modifying the retrieved at least one first execution time; and
a display module implemented by the at least one processor and configured to provide, for presentation to a user of the system, a graphical indicator of the execution progress of the first command based on the first estimated execution time;
the user interface module further configured to receive a second command to perform second and third computer tasks;
the progress module further configured to:
compare the second and third computer tasks to the log;
retrieve from the log, based on comparisons between the second and third computer tasks and second and third stored computer tasks of the log, second and third execution times corresponding respectively to the second and third stored computer tasks; and
generate a second estimated execution time for the second command by summing the retrieved second and third execution times; and
the display module further configured to provide, for presentation to a user of the system, a second graphical indicator of the execution progress of the second command based on the second estimated execution time.

15. The system of claim 14, further comprising a task execution module implemented by the at least one processor and configured to:
measure an execution time of the first computer task on the computer system; and store a representation of the first command and the measured execution time in the log, the representation of the command to be compared with a subsequent command to perform a subsequent computer task on the computer system to determine an estimated execution time for the subsequent computer task.

16. The system of claim 14, wherein:
the first command comprises at least one parameter affecting the execution time of the first computer task,
each of at least some of the plurality of commands in the log comprises at least one parameter affecting the execution time of the computer task corresponding to the associated command, and
the comparing of the first command to the log comprises comparing the at least one parameter of the first command to a corresponding parameter of at least one stored command of the log.

17. The system of claim 14, wherein:
the progress module is further configured to retrieve, based on the comparison between the first command and all of the commands of the log, a default execution time; and
the display module is further configured to provide, for presentation to the user of the computer system, a third graphical indicator of the execution progress of the first command based on the default execution time.

18. The system of claim 14, wherein the comparison between the first command and the first stored command of the log comprises the first command being most closely related to the first stored command of the log compared to other stored commands of the log.

19. The system of claim 14, wherein the progress module is further configured to:
retrieve from the log, based on a comparison between the first command and a second stored command of the log, a fourth execution time corresponding to the second stored command; and
generate the first estimated execution time further based on the retrieved fourth execution time for the second stored command.

20. The system of claim 19, wherein the first estimated execution time is based on at least one of an average, a median, a mode, and an interpolation of the retrieved first execution time and the retrieved fourth execution time.

* * * * *